US009108618B2

(12) United States Patent  (10) Patent No.: US 9,108,618 B2
Muller  (45) Date of Patent: Aug. 18, 2015

(54) GEARBOX ARRANGEMENT
(76) Inventor: Werner Muller, Eggingen (DE)
( * ) Notice: Subject to any disclaimer, the term of this patent is extended or adjusted under 35 U.S.C. 154(b) by 118 days.
(21) Appl. No.: 13/805,358
(22) PCT Filed: Jun. 27, 2011
(86) PCT No.: PCT/EP2011/003144
§ 371 (c)(1),
(2), (4) Date: Dec. 19, 2012
(87) PCT Pub. No.: WO2012/000633
PCT Pub. Date: Jan. 5, 2012
(65) Prior Publication Data
US 2013/0090815 A1  Apr. 11, 2013
(30) Foreign Application Priority Data
Jun. 28, 2010 (DE) .......... 10 2010 025 274
(51) Int. Cl.
B60W 10/02 (2006.01)
B60K 23/04 (2006.01)
(Continued)
(52) U.S. Cl.
CPC ............ B60W 10/023 (2013.01); B60K 17/165 (2013.01); B60K 23/04 (2013.01);
(Continued)
(58) Field of Classification Search
CPC ........................ B60K 174/165; B60K 23/04
USPC ...................... 701/48; 74/606, 607
See application file for complete search history.

(56) References Cited
U.S. PATENT DOCUMENTS
4,126,994 A  11/1978 Rockwell
4,471,669 A  9/1984 Seaberg
(Continued)

FOREIGN PATENT DOCUMENTS
DE 4138074 2/2003
DE 10348959 5/2005
(Continued)

OTHER PUBLICATIONS
EPO translation of DE 102009020089 A1, GB 2394262 A.*
(Continued)

Primary Examiner — Fadey Jabr
Assistant Examiner — Yazan A Soofi
(74) Attorney, Agent, or Firm — Volpe and Koenig, P.C.

(57) ABSTRACT

A gearbox arrangement (1), which is arranged in a drive train of a multi-axle land vehicle (2), in particular a commercial vehicle, or a similar means of transportation, wherein at least one of said axles is driven, wherein at least one planetary drive (8) is associated with each of the axle halves (5) of a driven axle. The gearbox arrangement comprises at least one sensor device (7) for detecting a steering manipulation on the vehicle (2) and a control device (6). In order to have a gearbox arrangement (1) available that establishes a reliable, simply designed connection between the drive motor and driven wheels (4) with little effort and enables reliable control of the particular wheels (4) in regard to rotational speed and torque during drive and during deceleration, and thus realizes a controllable rotational speed compensation during cornering and significantly reduces the diameter and the constructed size of the power-split gearbox in particular for vehicles (2) having a high axle torque, the axle halves (5) are driven synchronously without differential and the control device (6) is provided with a hydrostatic device (11) that can be manipulated, by which hydrostatic device each of the wheels (4) rolling without slip maintains its torque.

16 Claims, 9 Drawing Sheets

(51) Int. Cl.
*B60K 17/16* (2006.01)
*B60W 10/115* (2012.01)
*B60W 30/18* (2012.01)
*F16H 48/10* (2012.01)

(52) U.S. Cl.
CPC ...... *B60W 10/115* (2013.01); *B60W 30/18145* (2013.01); *B60W 2540/18* (2013.01); *B60W 2720/28* (2013.01); *B60W 2720/406* (2013.01); *B60Y 2200/22* (2013.01); *B60Y 2200/41* (2013.01); *F16H 48/10* (2013.01)

(56) References Cited

U.S. PATENT DOCUMENTS 6,102,824 A 8/2000 Kosodo et al.
6,464,056 B1 * 10/2002 Lowell et al. .................. 192/35
2003/0054914 A1 * 3/2003 Tomari et al. ................ 475/231

FOREIGN PATENT DOCUMENTS

| DE | 102009020089 | | 5/2010 |
| DE | 102009020089 A1 * | 5/2010 |
| EP | 0167043 | | 1/1986 |
| GB | 2394262 | | 4/2004 |
| GB | 2394262 A * | 4/2004 |

OTHER PUBLICATIONS

Besson, B., "Double Epicycle a Glissement Controle Application a la Traction Desvehicules Doble Epicycle to Control Slip: Implementation on Drive-Trains", Ingenieurs De L'Automobile, Editions VB, Garches, France, No. 649, Jun. 1, 1989, pp. 104-107.

* cited by examiner

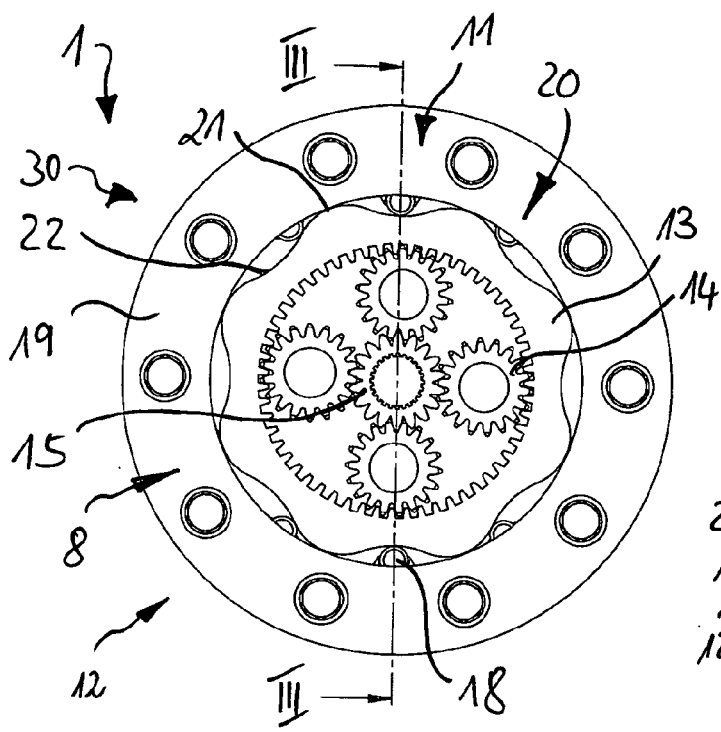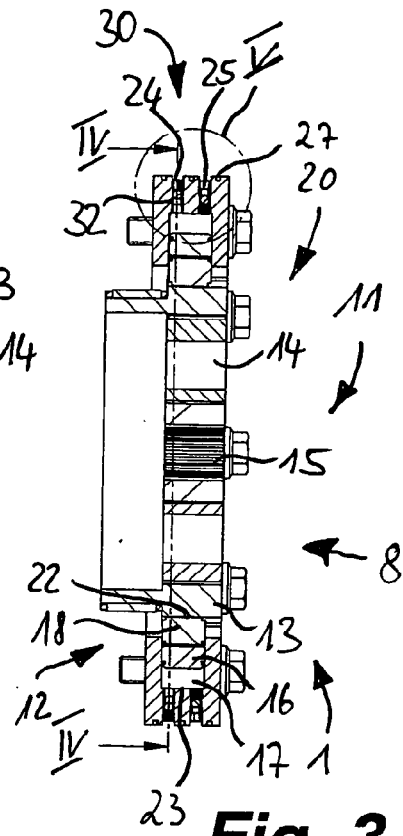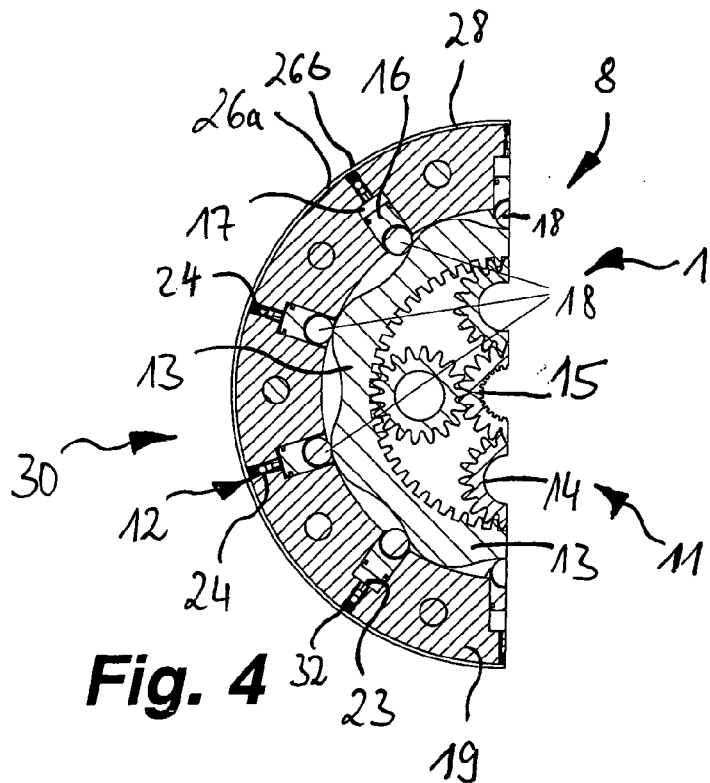
Fig. 2
Fig. 3
Fig. 4

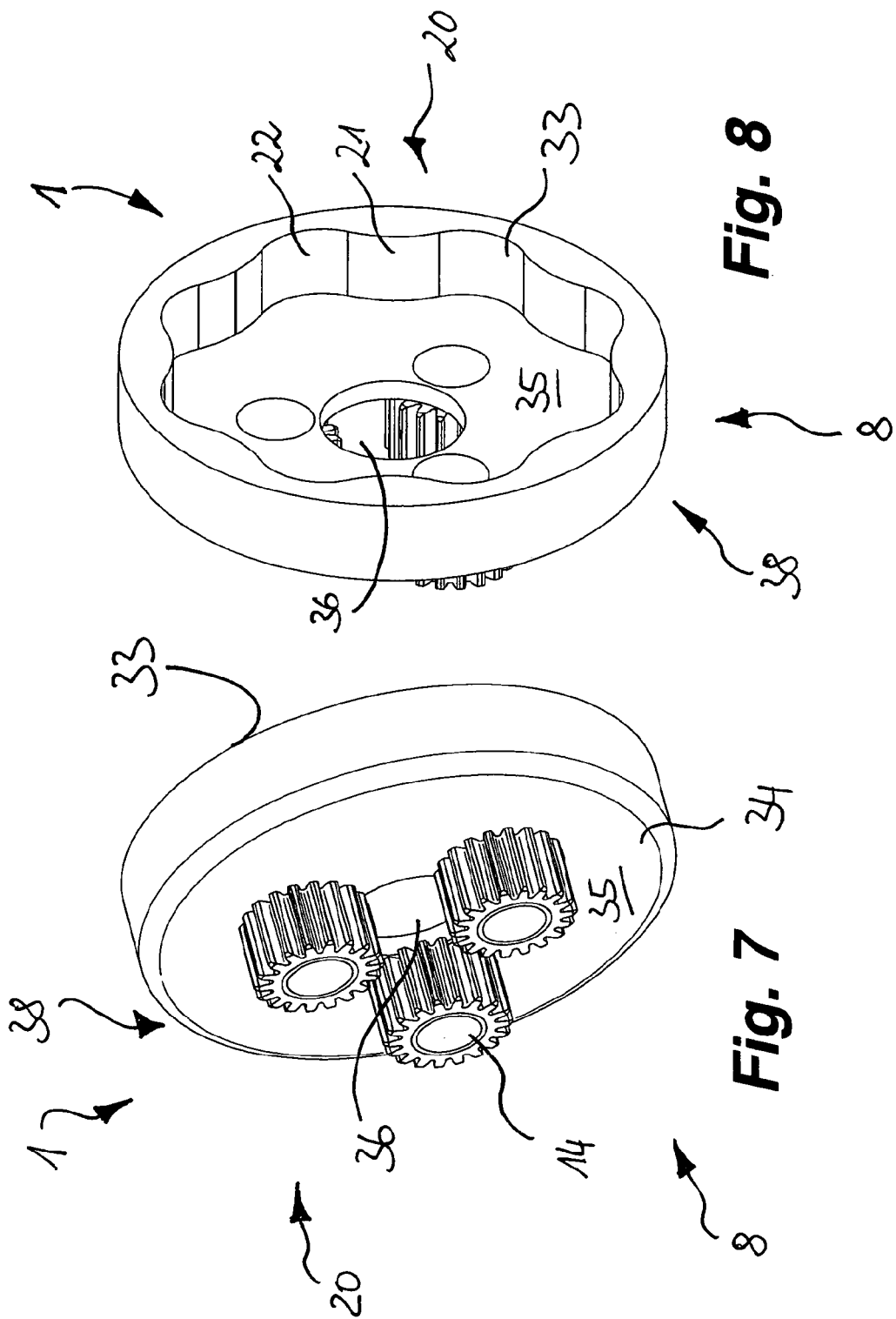

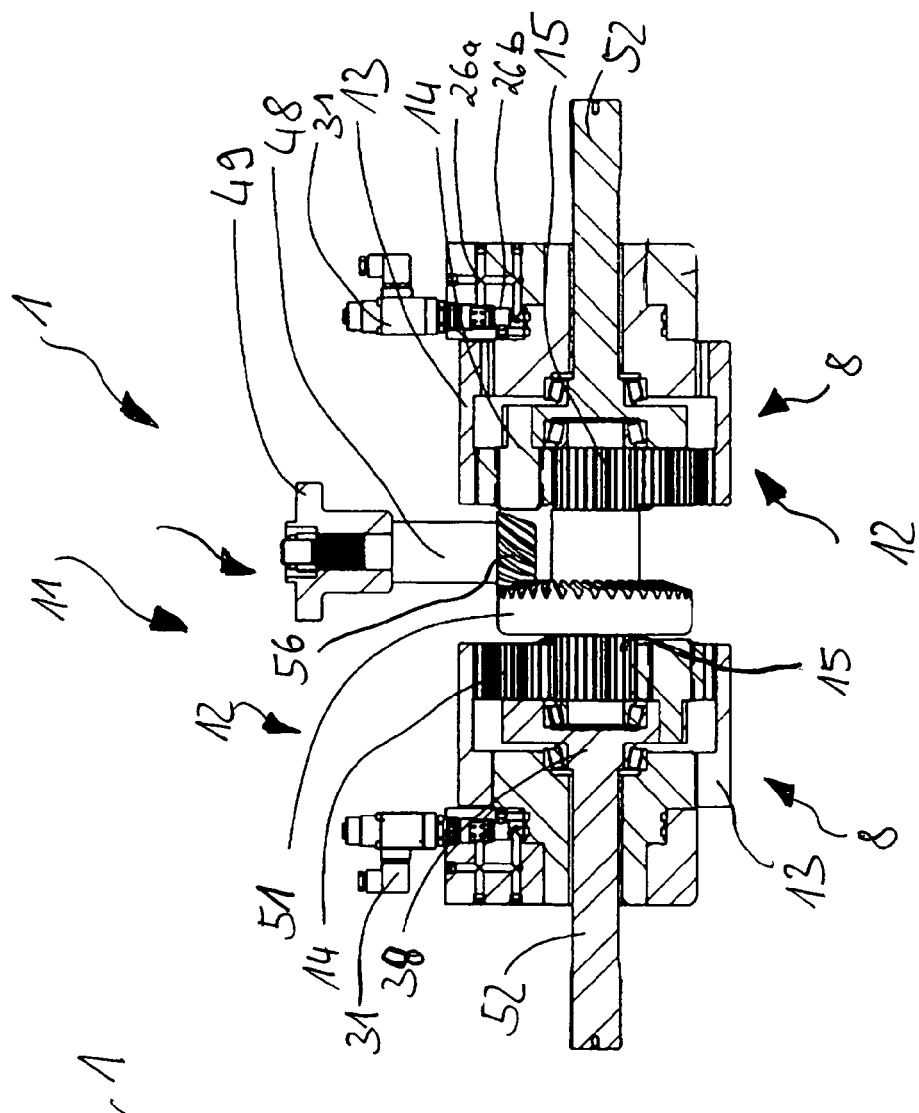
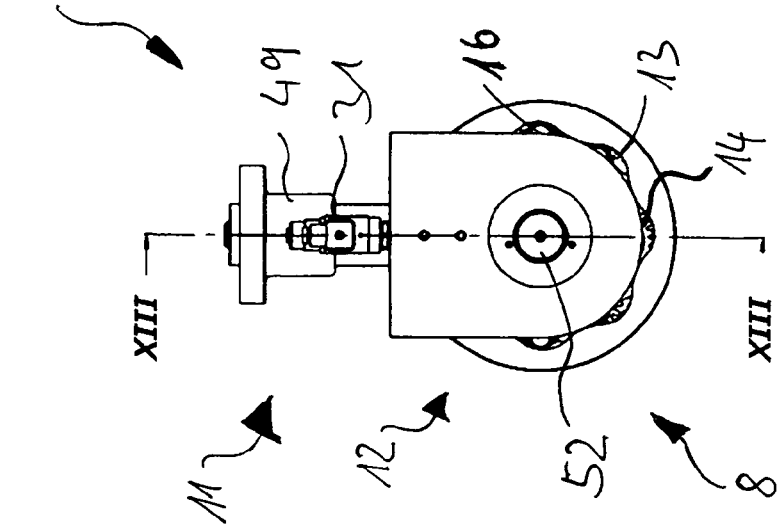
Fig. 13
Fig. 12

GEARBOX ARRANGEMENT

BACKGROUND

The invention relates to a gearbox arrangement which is arranged on the drive train of a single-axle or multi-axle land vehicle, in particular a commercial vehicle or similar transportation means, at least one of said axles being driven, wherein at least one planetary drive is associated in each case with the axle halves of a driven axle and comprising at least one sensor device for detecting a steering manipulation on the vehicle, and comprising a control device, wherein the planetary drives are able to be controlled by the control device using values calculated from the steering manipulation data, such that each of the relevant wheels arranged on the respective axle half is driven at a rotational speed at which it rolls without slip.

Such gearbox arrangements are known, in particular, from the field of commercial vehicles with propulsion power in a range greater than 100 kW, for example in agricultural vehicles, tractors or construction machines, wherein in the relevant vehicles, the planetary drive in the driven axles is used as a reduction gear with a fixed gear reduction, in which the output shaft connected fixedly thereto is driven by the sun gear and via the planet carrier.

Such a gearbox arrangement which is intended to produce and control a connection between the drive motor and the driven wheels of the land vehicle is, for example, disclosed in DE 41 38 074 A1, by means of which a controllable differential is implemented. However, it may be a drawback in the previously known gearbox arrangement that a relatively high use of mechanically moved parts is required which are also potentially at risk, primarily in the rotational area of said power-split gearbox. The entire system also has to be sealed internally whereby a device compensating for the equalization of the volume of fluid has to be provided and which compensates for the equalization of the volume of the fluid, which itself in turn requires an internal seal. When a slide-like control element of the control device located in the rotational area is spaced apart outside the rotational area, mechanical connections are also required between the stepping motor cited in DE 41 38 074 A1 and the control element which in practice result in control errors.

A gearbox arrangement is further disclosed in DE 103 48 959 A1 which is arranged on the drive train of a multi-axle vehicle, wherein at least one planetary drive is associated with the axle halves of a driven axle in each case, and in which a control device activates brakes in order to control the rotational speed of the wheels. In this case, the relative movements within an axle are compensated via at least two three-shaft planetary drives and a clutch system so that in practice the gearbox device equates to a mechanical differential and is also only effective on a single axle.

Finally, additional equipment of said vehicles from the commercial vehicle field, such as for example a mixing device, a rotating platform or a hoist with an entirely hydraulic drive and in each case an associated reduction gear, is disclosed in U.S. Pat. No. 6,102,824.

SUMMARY

It is, therefore, the object of the present invention to provide a gearbox arrangement which at low cost produces both a secure, simply constructed connection between the drive motor and the driven wheels and, when driven and when decelerating, permits a reliable control of the relevant wheels with regard to rotational speed and torque and thus implements a controllable rotational speed compensation during cornering and significantly reduces the diameter and the overall size of the power-split gearbox, in particular for vehicles having a high axle torque The object is achieved by a device according to claim 1. Developments of the device form the subject-matter of the sub-claims.

Thus, according to the invention a gearbox arrangement is formed in which the axle halves are driven in a direct, synchronous manner and the planetary drives may be controlled by the control device using values calculated from the steering manipulation data such that each of the relevant wheels arranged on the respective axle half is driven at a rotational speed at which it moves without slip whilst maintaining the torque, whereby in the gearbox arrangement according to the invention via the planetary gear trains arranged on the respective planetary drive each driven wheel is controlled individually with regard to rotational speed and torque and driven and/or decelerated independently of different coefficients of friction between the tires and the contact surfaces thereof, which is why the control device of the gearbox arrangement comprises a hydrostatic device which may be manipulated, via which the movement of each of the planet carriers and thus the planetary drives of the output shafts leading to the wheels, is possible in a suitable manner.

Increasing the torque which is otherwise associated with a reduction in rotational speed is compensated according to the invention by hydraulic power loss via the hydrostatic device, with the torque remaining the same. The above naturally also applies equally to a plurality of driven axles and thus also in all-wheel drive vehicles, in which the longitudinal differential may be dispensed with.

The gearbox arrangement according to the invention is accordingly characterized in that the required difference in rotational speed, namely when cornering, of the wheels of one or more axles or an axle train, is not compensated by the differently acting torques via a differential gear, i.e. a differential, but via controlled planetary drives arranged downstream of a branching gear and which individually drive or brake the further drive shafts, to which one or more wheels are associated, wherein the wheels are driven without a differential and synchronously, i.e. fixedly and/or in the same direction. In the case of a steering angle, the paths to be covered by the individual wheels are calculated and the rotational speed of the wheels on the inside of the corner are reduced by a value which permits each wheel to roll without slip whilst maintaining the torque and the control of the steering behavior according to the invention and the driving stability, whereby the economical cost in terms of energy and production of a vehicle provided with such a gearbox arrangement is the same as that of a mechanical drive. The relative alterations of the rotational speed of the wheels are always the result of calculated values. They are independent of the various coefficients of friction. The device makes the use of a so-called differential superfluous and makes the previously required constructional space available for other uses. This advantage is particularly valid in so-called system vehicles and tub-type vehicles. By the term "steering manipulation" is able to be understood not only a steering angle and thus the associated angular alteration but any alteration to the steering state carried out by manipulation which is detectable by sensor, i.e. also an alteration to the rotational speed or the torque.

According to a development, in this case, the control device of the gearbox arrangement according to the invention may be provided with at least one control element, in particular a proportional valve, for controlling the circuit of a hydraulic control means, which controls the supply and the discharge of the control means, which is configured as hydraulic fluid, out of and/or into a fluid reservoir.

A space-saving construction of a gearbox arrangement is achieved by a design in which the planetary drive on the output side of a power-split gearbox of the drive train is arranged on the driven axle half, as in this case high torques are produced close to the wheels, and thus the gears and branching gear may be provided to have correspondingly smaller volumes.

In order to be able to manipulate all driven wheels of a vehicle by means of the control device with regard to rotational speed and torque in the respective vehicle state, according to an advantageous development of the gearbox arrangement it is proposed to provide said gear box arrangement with in each case at least one planetary drive for each axle half.

For maintaining a secure operation of the gearbox arrangement on the relevant land vehicle, it is advantageous in one embodiment to arrange at least one control element of the control device spaced apart from the controlled planetary drive, so that it is not located in the rotational area of the planetary drive.

In an embodiment of the gearbox arrangement which is simple to produce and able to be easily handled, a rotating control member with a closed contour may be arranged on the planetary drive, said control member being provided with alternately convex and concave curved member portions which form cams and valleys which, in particular, have an elliptical curvature. A surface to be acted upon by the relevant contour of the control member is thus able to roll in a continuous movement on the member portions which virtually merge with one another with their alternating curvature, so that a smooth movement without jerking may be transmitted by means of the control member.

According to a preferred development, on the gearbox arrangement the control member of the planetary drive is provided fixedly in terms of rotation as an annular axial portion of a rotating carrier, the rotation thereof driving a plurality of piston-cylinder arrangements of the hydrostatic device spaced apart by the same angle. In this case, an end portion facing the control member of the movable piston of a piston-cylinder arrangement may expediently run on the contour surface of the annular axial portion of the carrier, wherein in this case, in axial terms, the portion encompasses one of the shafts leading to the planetary drive or leading away therefrom, over part of its longitudinal extent. By its rotation, the annular axial control portion with its alternating sequence of cams and valleys causes a radial movement of the piston in its cylinders.

A further expedient development of the gearbox arrangement may be that the axial portion on the carrier is arranged in a coplanar manner or is axially offset to the internal gear wheel of the planetary drive.

Particularly preferably, in a further development of the gearbox arrangement the carrier is formed by the internal gear wheel or a planet carrier, in particular in this case the internal gear wheel itself may be provided with the annular axial control portion as an external contour, which moves in a housing encompassing the internal gear wheel. The cams and valleys are in these developments, therefore, turned radially inward or outward on the annular axial control portion, for example outward as in the described internal gear wheel or, for example, inward on a portion of the planet carrier.

In order to be able to roll easily on the alternating cams and valleys of the control portion and, in particular, also uniformly, in a particularly preferred embodiment of the gearbox arrangement it may be provided to form the pistons as roller pistons, wherein the line of the cylinder surface of the relevant roller in contact with the control portion when rolling, in particular, forms a right angle with the surface edges in each case. Here, the front faces of the roller are arranged parallel with the front faces of the carrier or the control portion, so that the relevant roller is in the best possible contact with the portion of the contour of the axial portion facing said roller and is able to roll on said axial portion.

A uniform delivery rate of hydraulic fluid for operation of the hydrostatic device which is able to be manipulated, is achieved in an embodiment of the gearbox arrangement in which the number of piston-cylinder arrangements exceeds that of the cams by two.

In an embodiment of the gearbox arrangement, the planetary drive and the piston-cylinder arrangements are able to move easily relative to one another, and in which the piston-cylinder arrangements are received in an annular disk-shaped or disk-shaped housing, which encompasses the control member and/or is encompassed thereby, so that a coaxial arrangement of said two parts is formed.

In this case, in an advantageous development of the gearbox arrangement the carrier may be provided with an, in particular, disk-like planar base, which on one side carries the planet wheels of the planetary drive, whilst the control portion arranged on the edge of the base protrudes from the other side of the base.

In an expedient, and thus space-saving, development of the gearbox arrangement in which the inserted or withdrawn shaft may be advantageously accommodated, on the base of the carrier a central opening is provided through which a portion of the drive shaft or output shaft is inserted.

A control unit which may be easily handled of the hydrostatic device which may be manipulated has a valve arrangement in which the cylinder bases of the piston-cylinder arrangements remote from the carrier are able to be connected via one respective suction valve and/or pressure valve to one respective suction side and pressure side of a transport device of the hydraulic fluid surrounding the housing.

A further development of the gearbox arrangement is particularly simple to implement, in which the transport device is formed by at least one annular channel on the housing associated with each suction valve and each pressure valve or is formed by hydraulic lines, wherein the channels or lines are able to circulate around the housing on the edge.

In a further expedient development in which the cylinders are correctly filled and, moreover, the roller pistons are securely pressed against the rolling surface associated therewith on the external contour of the axial portion, the annular channel of the suction side, i.e. the suction channel, may be connected to a low pressure supply of the hydraulic fluid. If the suction channel is simply connected to a fluid reservoir, for drawing fluid into the cylinder chamber of the pistons, if required, an additional spring means may be arranged in order to assist the piston movement in the direction of the lifting ring moving the pistons. With such an arrangement, the quantity of hydraulic fluid returned to the proportional valve may be advantageously supplied again directly to the suction side, so that by means of the springs the entire quantity of fluid discharged would not have to be drawn in again, but quantities of fluid lost as a result of squeezing losses merely compensated via a feed valve. Relative to other conceivable fluid supplies, which have also had to be altered in some arrangements, when filling the system by means of a low pressure supply a permanent supply of fresh, cooled and filtered fluid may be implemented in any event.

In an expedient development reducing the undesired escape of hydraulic fluid and thus also a loss of pressure, in the gearbox arrangement the housing of the piston-cylinder arrangements is arranged in a receiver of an axle housing or gearbox housing such that the wall thereof seals the groove-like annular channels relative to one another. However, further sealing means to be accommodated in corresponding receivers are also provided on the housing.

In order to ensure the return of the control means into the fluid reservoir or to make the control means otherwise available for lubricating purposes, for example, in a further embodiment of the gearbox arrangement the housing of the piston-cylinder arrangements is connected in a region of its periphery on the pressure side to the control element, which may be implemented via the gearbox housing mentioned above for accommodating the piston-cylinder arrangements. The control element may, for example, be connected to the reverse steering motion of the vehicle, which due to the suction means thereof guarantees a practically continuous fluid supply in the circuit.

An expedient development of the invention which, constructed in a simple manner on the wheels, permits a separate fluid supply, may be that the piston-cylinder arrangements in each case are provided with at least one mechanical actuating means for assisting the movement of the pistons in the direction of the internal gear wheel, so that quantities of lost fluid may be drawn in without a further fluid pump. Said actuating means may, for example, be formed as a spring moving the piston in its cylinder.

In this case, depending on the driving and environmental conditions, in a further embodiment of the gearbox arrangement it may also be advantageous to connect a cooling device and/or a cleaning device to the transport device of the hydraulic fluid, so that the hydraulic fluid may be cooled or filtered, for example.

In a further advantageous embodiment of the gearbox arrangement, the planetary drives of the two axle halves of a driven axle with the associated hydrostatic device comprising the control element may be arranged in the immediate vicinity of an axle power-split gearbox which may be associated with the axle halves, so that said gearbox arrangement forms a very compact, closed unit, the functionality thereof otherwise corresponding to that described above, however.

The compact construction of said embodiment of the gearbox arrangement may be achieved by, for example, the sun gears of the planetary drives being operatively connected to an adjacent crown wheel of the drive, wherein in particular one of the sun gears may be configured integrally with the crown wheel.

In a further embodiment of the gearbox arrangement which is also beneficial to the compact construction of the gearbox arrangement, the planet gears of the planetary drives may be connected to a planet carrier, which in turn is connected fixedly in terms of rotation to the output shaft associated with the respective planetary drive, in particular is configured integrally therewith.

In order to be able to assist torque potentially created during travel on the internal gear wheels, when the hydrostatic device is deactivated or not supplied with current, in a further development of the gearbox arrangement a differential gear which may be connected via a switching means may be arranged thereon, wherein the connection itself is optionally able to be regulated by an associated control device.

Advantageously, in this case, the differential gear may have a countershaft operatively connected to the internal gear wheels of the planetary drives, so that a mechanical compensation of the torque may take place.

In an embodiment of the gearbox arrangement, the ability to operate in a simple manner the differential gear, which may be engaged, is ensured in which the engaging means is provided as a clutch, in particular a claw clutch or friction clutch or a further hydrostatic device.

BRIEF DESCRIPTION OF THE DRAWINGS

The invention is described in more detail hereinafter with reference to exemplary embodiments in the drawings. In this case, in a partially schematic view:

FIG. 2 shows a planar side view of a first exemplary embodiment of the gearbox arrangement with the hydrostatic device which is able to be manipulated and with a control member arranged on a carrier;

FIG. 3 shows a sectional side view of the gearbox arrangement of FIG. 2 along the cutting line III-III;

FIG. 4 shows a sectional side view of the gearbox arrangement of FIG. 3 along the cutting line IV-IV;

FIGS. 7, 8 show two perspective side views of a front and rear face of a further exemplary embodiment of the gearbox arrangement with the carrier formed as planet carrier with the axial control portion;

FIG. 12 shows a side view of a further exemplary embodiment of a gearbox arrangement according to the invention in which said arrangement is arranged in the vicinity of the axle branching gear;

FIG. 13 shows a partially sectional side view of the gearbox arrangement of FIG. 12 along the cutting line XIII-XIII;

DETAILED DESCRIPTION OF THE PREFERRED EMBODIMENTS

Figure 1:
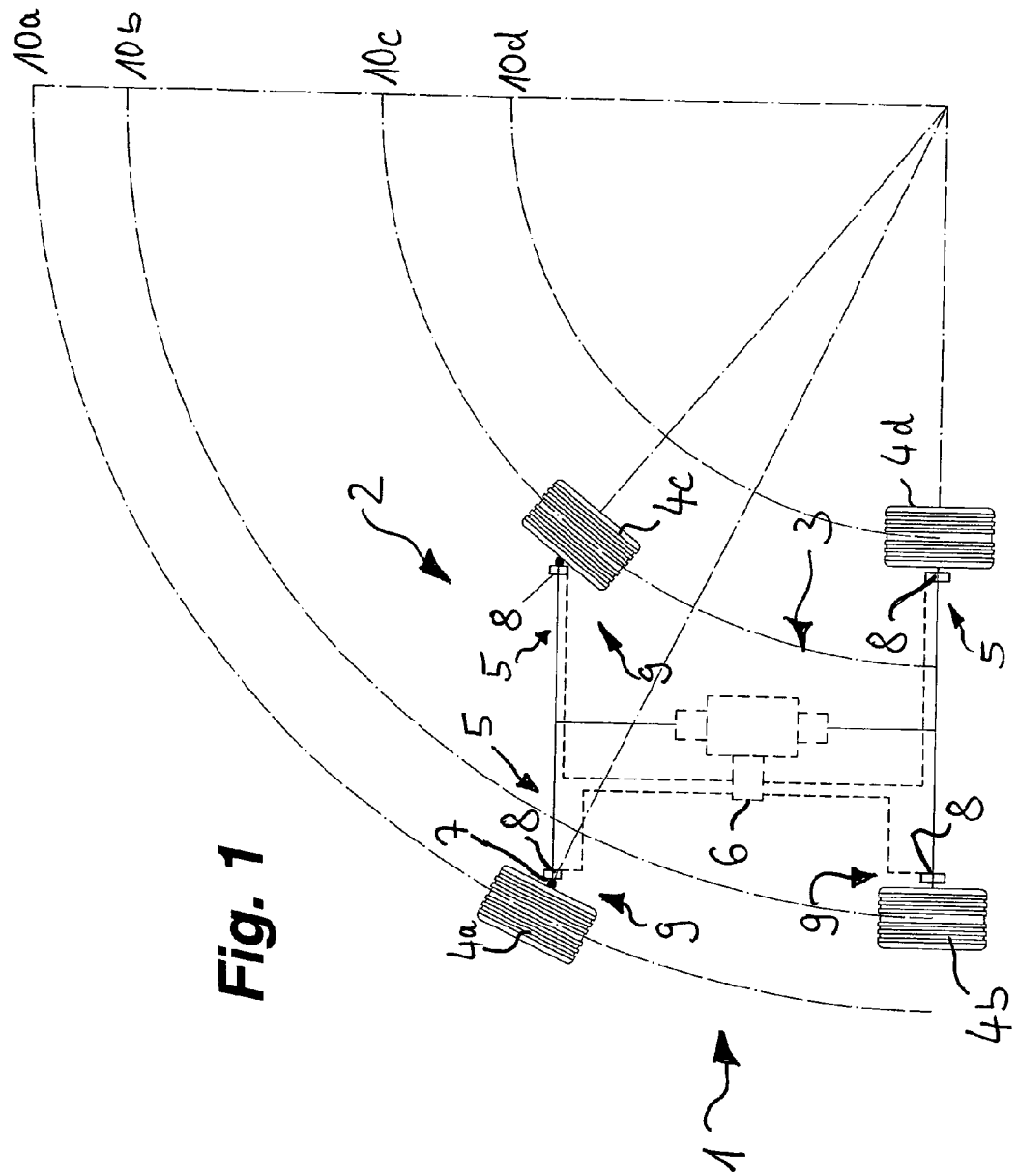
FIG. 1 shows a plan view of the schematic rolling paths of driven wheels of a land vehicle provided with the gearbox arrangement according to the invention.

In FIG. 1 initially a land vehicle 2 may be seen, on which the four wheels 4a, b, c, d thereof are directly driven by a drive 3 on the axle half drive shafts 5, in each case, i.e. without a differential, the connection in this case being produced between the drive 3 and the wheels 4 by a gearbox arrangement denoted as a whole by 1. The vehicle 2 of FIG. 1 is a vehicle without a branching gear, the axle halves of the front and rear axle being driven via bevel gears not shown further as drive means in fixed dependency. During cornering, however, as also may be seen in FIG. 1, four different sequence lines 10a-10d of the wheels 4a-4d are implemented which correspondingly require four different rotational speeds of the wheels.

This gearbox arrangement 1 has a control device 6 and a sensor device 7, and a planetary drive 8 is arranged in each case on the gearbox arrangement for each axle half, whereby each of the drivable wheels 4 is driven and/or decelerated individually, wherein the control device 6 using values detected by the sensor device 7, and produced by steering manipulation during forward movement of the vehicle 2, controls the planetary gear trains 9 of the planetary drives 8 such that each wheel 4a-4d is driven at a speed at which it rolls without slip whilst maintaining the torque. In FIG. 1, only the sensor device 7 relevant for the indicated cornering is shown as a steering angle sensor 7 of the wheel 4a on the outside of the corner.

When the vehicle 2 visible in FIG. 1 is traveling on a right-hand corner, the gearbox arrangement 1 according to the invention is characterized in that the rotational speed difference of the wheels 4 required when cornering, of one or more axles or an axle train, is not compensated by the differently acting torques via a differential gear, i.e. a differential, but via controlled planetary drives 8 arranged downstream of the branching, which individually drive or brake the further drive shafts 5, to which one or more wheels 4 are associated. In the case of a steering angle, the paths 10a, 10b, 10c, 10d to be covered by the individual wheels are calculated and the rotational speed of the wheels 4b, 4c and 4d on the inside of the corner are reduced by the value which permits each wheel 4 to roll without slip whilst maintaining the torque.

In FIGS. 2 to 4, a circular hydrostatic device 11 is shown of the gearbox arrangement 1 which may be manipulated, comprising ten piston-cylinder arrangements 12 distributed at the same angular distance over the annular housing 19. The hydrostatic device 11 encompasses the planetary drive 8 associated with an axle-half drive shaft 5, which comprises the internal gear wheel 13, the four planet gears 14 and the sun gear 15.

Driven by the central sun gear 15 in this arrangement, the four planet gears 14 mesh with the internal toothing of the internal gear wheel 13, so that said internal gear wheel is set in rotation. On the planetary drive 8 of FIGS. 2 to 4, a rotating control member 20 with a closed contour is arranged which is provided with alternately convex and concave curved member portions relative to the rotational axis, which form cams 21 and valleys 22. The eight cams 21 and as many valleys 22 have in this case an elliptical curvature. The control member in this embodiment is accordingly formed by the external contour of the internal gear wheel 13. At the same time, within the meaning of the invention, the internal gear wheel 13 forms as a control member 20 an annular axial portion 33 of a rotating carrier 34, which drives the pistons 16 with its external contour.

The pistons 16 of the piston-cylinder arrangements 12 arranged radially in their cylinders 17, engage with their rollers 18 facing the planetary drive 8 in the recesses formed by the valleys 22 between the cams 21 of the external contour of the internal gear wheel 13. By the rotation of the internal gear wheel, as a result of the drive by the sun gear 15 and the planet wheels 14, the pistons 16 perform a radial movement and roll on the external contour of the internal gear wheel 13.

Figure 5:
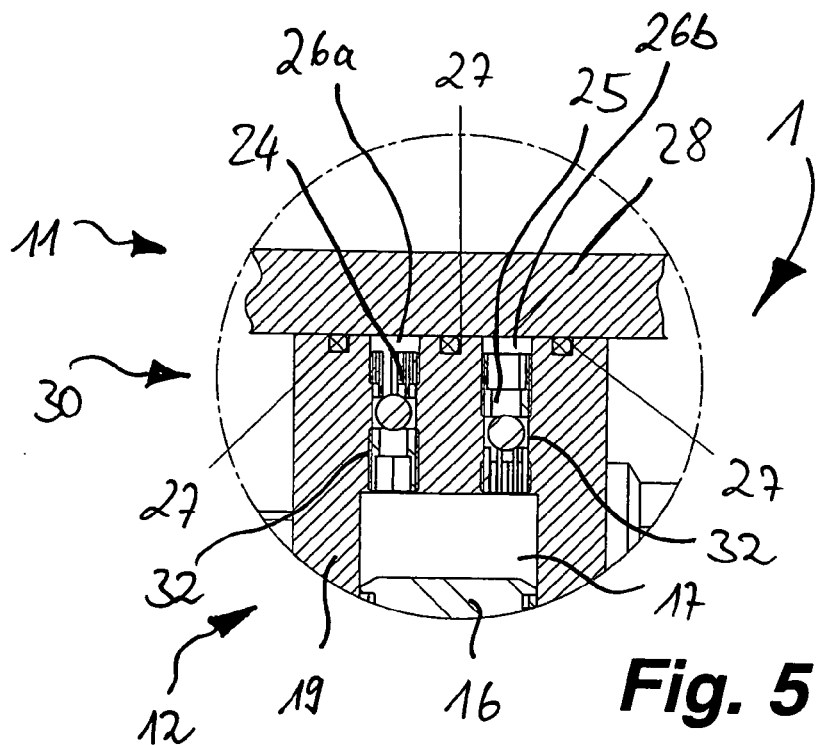
FIG. 5 shows a detailed sectional view as a planar side view of the encircled region V of the gearbox arrangement of FIG. 3.

As derived most clearly from FIG. 5, which shows the encircled region of FIG. 3 indicated by the letter V widened by the wall of the housing 28 of a gearbox, not shown, on the cylinder bases 23 of the cylinders 17 of the piston-cylinder arrangements 12 one respective suction valve 24 and pressure valve 25 are in each case located in a receiver 32. The receivers 32 are arranged in succession in the axial direction of the housing 19, so that in the sectional view of FIG. 5 only the receivers 32 of the suction valves may be seen. The valves 24, 25 are in each case connected to annular channels 26a, 26b formed by the region of the receiver 32 remote from the internal gear wheel 13, and circulating around the housing 19, whereby in each case all suction valves 24 and pressure valves 25 of the hydrostatic device 11 are connected together. The connection of the groove-like suction and pressure channels 26a, 26b together forming the transport device 30 is prevented by the suitable arrangement of seals 27 guided in receivers parallel to the channels 26b, 26b.

Figure 6:
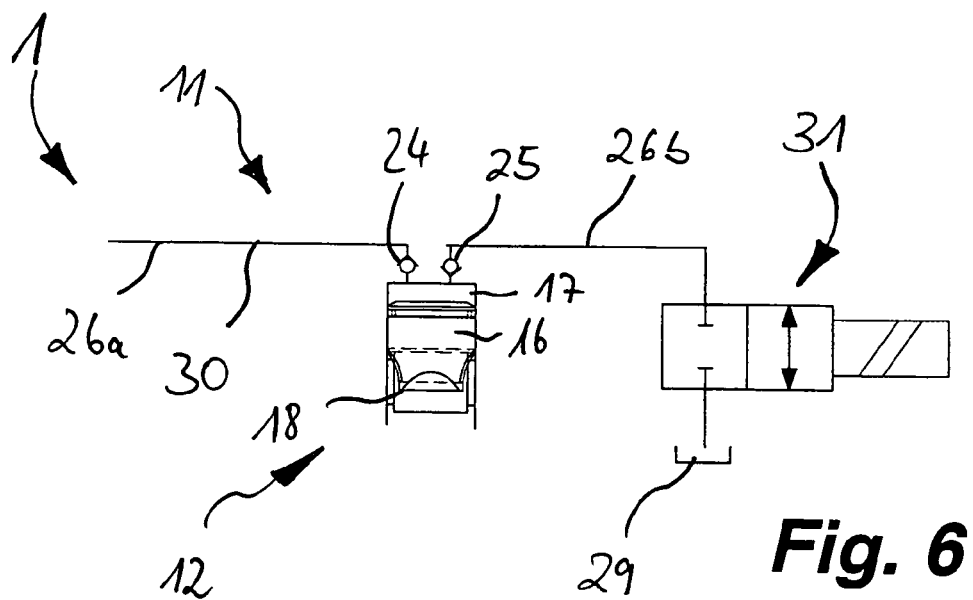
FIG. 6 shows a schematic view of the fluid circuit on the gearbox arrangement with a piston of a piston-cylinder arrangement, valves and a control element controlling the circuit.

The suction ring channel 26a is connected at a suitable point to a low pressure supply or a fluid reservoir. With an axial movement of the pistons 16 of the piston-cylinder arrangement 12, on the hydrostatic device 11 fluid is suctioned via the suction valves 24, whilst fluid is forced into the annular channel 26b via the pressure valves 25. The suction-annular channel and pressure-annular channel 26a, 26b are enclosed by the gearbox housing 28 and sealed relative to one another. At a suitable point in the gearbox housing 28, the pressure-annular channel 26b is connected to a control element 31, visible in FIG. 6 as a hydraulic proportional throttle valve. The control medium is returned to the fluid reservoir 29, and preferably may be made available for the lubrication of the gearbox mechanism, not shown in more detail.

Figure 9:
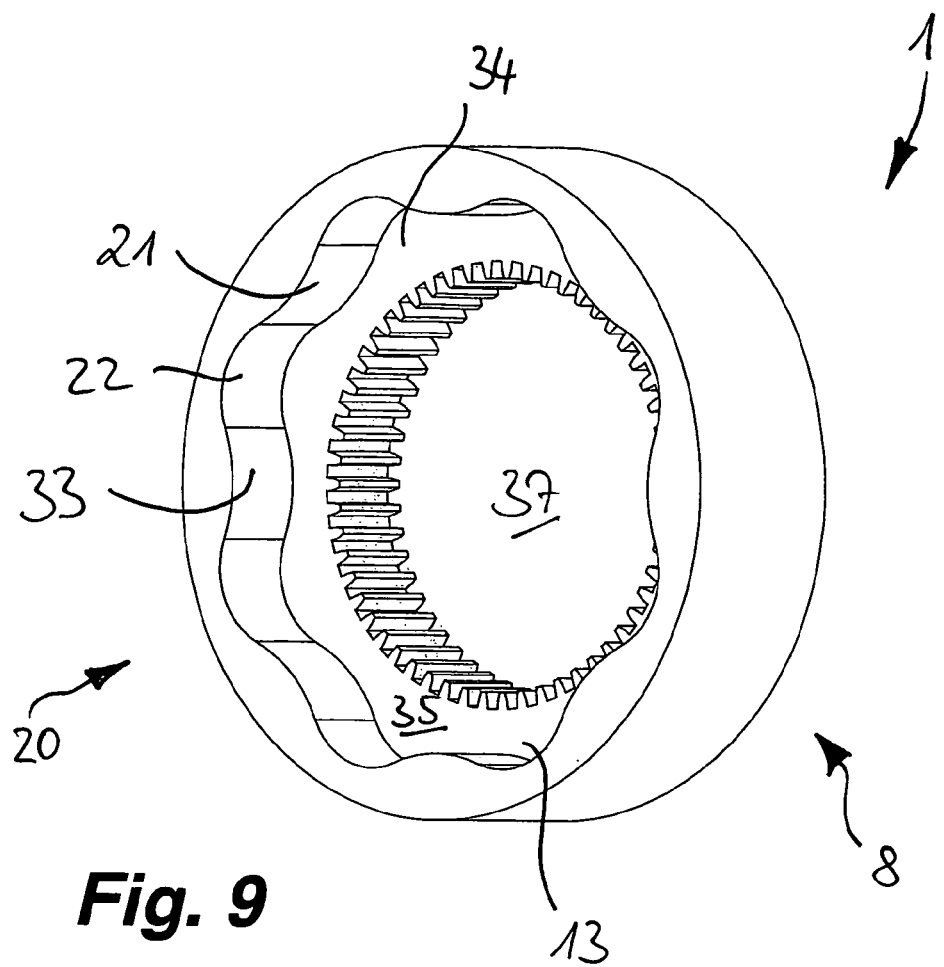
FIG. 9 shows a perspective side view of a further exemplary embodiment of the gearbox arrangement with the control portion arranged on the internal gear wheel as carrier.

In FIGS. 7 to 9, further exemplary embodiments of the control member 20 of the gearbox arrangement 1 according to the invention may be seen, wherein FIGS. 7 and 8 show two views of the front and rear faces of the same control member 20. In all three figures, the control member is formed as an annular axial portion 33 of a rotating carrier 34, wherein in the embodiment of FIGS. 7 and 8 the carrier 34 is formed by the planet gear carrier 38 of the planet gears 14 and in the example of FIG. 9 by the internal gear wheel 13. It is further revealed from FIGS. 7 to 9 that the axial portion is formed by an alternate sequence of cams 21 and valleys 22.

On one planar side the planet gears 14 of the planetary drive 8 arranged in a triangular configuration may be seen on the carrier base 35 of the carrier 34 of FIGS. 7 and 8. The axial portion 33 forms the edge of the carrier 34 protruding axially from the carrier base 35 on the side remote from the planet gears 14, with inwardly facing cams 21 and valleys 22. This means that the control member 20 with the axial portion 33 encompasses the housing 19, not shown, of the radial piston-cylinder arrangements 12, the pistons 16 thereof with their rollers 18 acting radially outwards and cooperating with a contour of the carrier 34 acting inwardly. Also, the control member 20 of FIG. 9, which is arranged on the internal gear wheel 13 as the carrier 34, behaves in a similar manner, one front face thereof forming the carrier base 35, from which the axial portion 33 protrudes. In this arrangement of the pistons 16 on the disk-like housing 19, the transport device 30 may be provided in a central inner region separate therefrom.

For example a portion on the drive side of the drive shaft 5, not shown, may engage in the through-passage 36 of FIGS. 7 and 8, which on its end facing the planetary drive 8 is connected to the sun gear, also not shown, to be centrally arranged between the planet wheels 14. In contrast, the planet carrier engages in the through-passage of FIG. 9, with the planet gears 14 meshing with the toothing of the internal gear wheel 13. The exemplary embodiments of FIGS. 7 to 9 are intended to indicate that all parts may be driven and propelled by means of a planetary drive 8.

Figure 10:
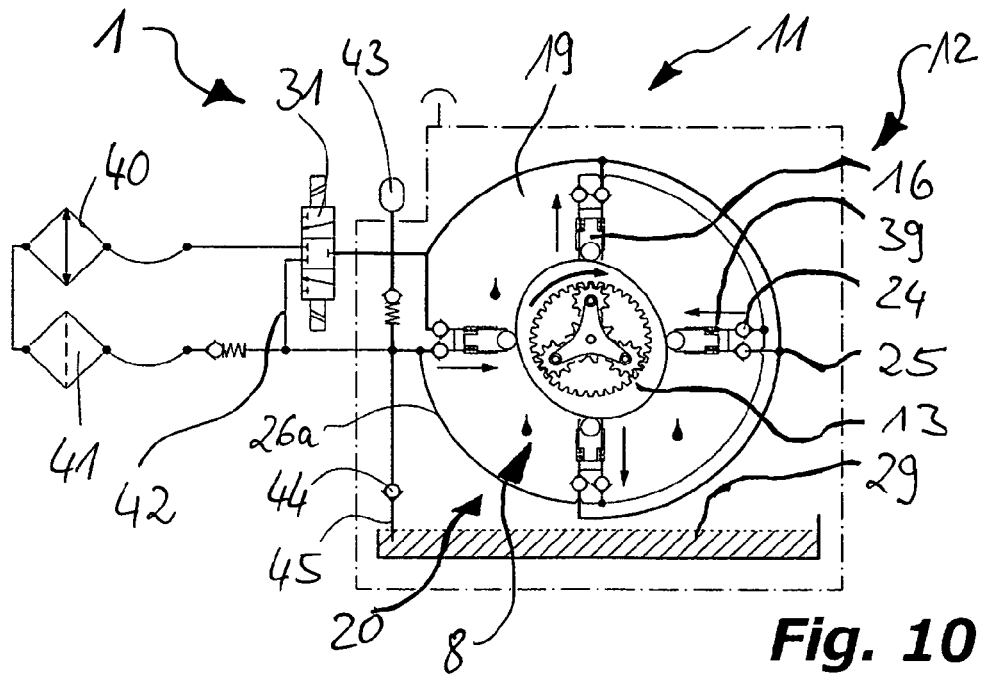
FIG. 10 shows a schematic simplified view of the fluid circuit on a gearbox arrangement with four roller pistons and control member.

In FIG. 10, a gearbox arrangement 1 is shown schematically and in which, in a simplified view, the piston-cylinder arrangement 12 is provided with four roller pistons 16 on the housing 19, which is why the internal gear wheel 13 is shown eccentrically. The pistons 16 are returned in this case not by means of a supply fluid but by actuating means 39 configured as springs. The quantity of fluid lost by the leakage of the piston seal is drawn through the suction pipe 45 connected to the fluid sump 29. The installed non-return valve 44 in this case prevents a flow of fluid in the opposing direction. During cornering of the vehicle 2, not shown, and in the case of cold oil, the control means 31 shown as a proportional hydraulic controller, is displaced downwards, whereby fluid flows through the bypass 42 directly into the suction channel 26a of the transport device 30 of the system. In the case of hot oil, the controller is displaced upwards and fluid may flow in turn via the cooler 40 and the fluid filter 41 into the suction channel of the transport device 30 of the system. Thus, without using a further fluid pump, each wheel 4a-4d of the vehicle 2, not shown, may be individually supplied, the fluid cooled and cleaned and a short circuit established with cold fluid, i.e. overall a very simple construction of the gearbox arrangement 1 implemented. Optionally, both the pressure channel and the suction channel of the transport device 30 may be connected to a hydraulic damper 43.

Now returning to FIGS. 1 to 6, when the control element 31 of FIG. 6 is closed no hydraulic fluid is able to escape and the pistons 16 of the piston-cylinder arrangement 12 are not able to move. The internal gear wheel 13 is then immovable, whereby the vehicle 2 is driven without reducing the rotational speed of the device according to the invention. The branching of the drive train of the vehicle 2 takes place in this case in a fixed manner, i.e. there is no differential arranged in the drive train. Both axle drives are driven at the same rotational speed. During the cornering shown in FIG. 1, the steering angle is detected by a sensor 7 and forwarded to the control device 6. The sequence lines 10a-10d are calculated and the control means controlled, so that the required quantity of fluid for reaching the correct rotational speed difference may escape through the control element 31, and the wheels are driven or braked irrespective of the coefficients of friction and loads whilst maintaining the torque. The rotational speeds of the wheels thus produced do not correspond to the movement compensation (double the rotational speed of the differential=the sum of the driven rotational speeds of the wheels) of a mechanical differential, but the wheel on the outside of the corner 4a is directly driven mechanically, whilst all the wheels following on the inside of the corner 4b, 4c, 4d are decelerated. The effect of the hydrostatic device 11 on the mechanical efficiency of the drive train is thus less than approximately 5 parts per thousand.

Accordingly, the exemplary embodiments of the figures are planetary drives 8 which may be controlled by a hydrostatic device 11 which may be manipulated, in a radial construction, wherein the internal gear wheel 13 or/and the planet gears 14 or/and the sun gear 15 are controlled such that the mechanical speed ratio is not a fixed variable but the rotational speed of the driven or further drive train is decelerated steplessly, wherein the control mechanisms required for the control, such as for example valves 24, 25, transport device 30 or control element 31, are in the non-rotating region.

As a result, with considerably reduced technical complexity relative to conventional gearbox arrangements a robust and maintenance-friendly construction of the gearbox arrangement 1 is achieved, which without the use of a differential, is able to implement all torque ranges. At the same time, no ventilation of the hydrostatic device 11 of the arrangement 1 is required as the system is filled and ventilated automatically, there are no temperature problems as the control medium is continuously replaced, and also no internal seal is required for the pistons of the system. Finally, the arrangement 1 makes it possible to keep the control mechanisms of the control device 6 away from the rotational area of the gearbox arrangement.

A further exemplary embodiment of the gearbox arrangement 1 is visible in FIGS. 12 and 13, wherein FIG. 13 is a partial sectional view of the view of FIG. 12 along the cutting line XIII-XIII at that point. In the two FIGS. 12 and 13 it may be seen that in this advantageous arrangement the hydrostatic device 11 is not arranged as described above with two control elements 31 in the region of the wheel hubs, but now directly adjacent or immediately adjacent to an axle power-split gearbox 50, with a bevel gear 56 on the drive side and crown wheel 51 meshing therewith. In this case, it is a very compact closed unit whilst the previously described unit is a dispersed construction. The function, in particular with regard to the hydrostatic device 11 and the steering manipulation which may be achieved thereby, i.e. with regard to the functional results, corresponds to the already-described exemplary embodiments. The difference lies in the very compact construction which is produced by at least one of the sun gears 15 being formed integrally with a crown wheel 51, or otherwise being at least operatively connected thereto in a fixed manner. The planet gears 14 circulating around the respective sun gear 15 are connected to the planet carrier 38, which in turn is configured integrally with the output shaft 52. With fixed internal gear wheels 13, a virtually fixed gear ratio exists between the drive pinion 49 located at the end of the drive shaft 48 opposing the bevel gear 56 and the two output shafts 52.

Figure 15:
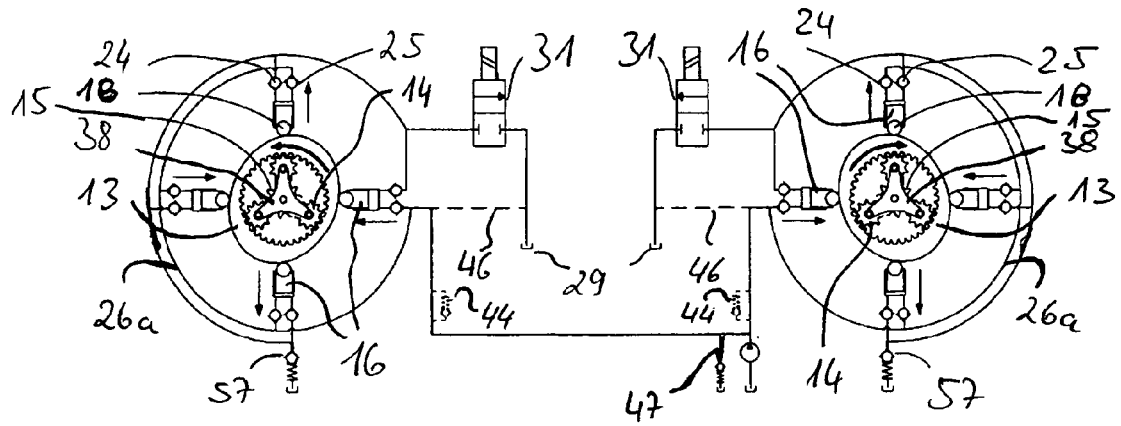
FIG. 15 shows a schematic view of the fluid circuit of the gearbox arrangement of FIGS. 12 and 13.

Now additionally considering FIG. 15, which shows the fluid circuit of FIGS. 12 and 13, when supplying current to the control elements 31 designed as magnetic valves, fluid is able to flow in the direction of the arrow to the control element 31. As a result, for each axle half, a controlled movement is permitted for the pistons 16, only four being shown for the sake of clarity, and the internal gear wheels 13 may rotate by a corresponding value. The rotational speed of the planet carrier 38 meshing with the associated output shaft is correspondingly reduced.

The advantages relative to the distributed variant of the gearbox arrangement 1 are initially represented in the extremely short fluid channels 26a, 26b of FIG. 13. Moreover, when the control element 31 is open (the aforementioned magnetic valve may be a proportional valve or a valve with an on-off function) the fluid is either fed back into the suction channel 26a via the connecting piece 46 or fed back into the fluid sump 29. A return into the fluid sump 29 has the advantage that when cooling is possibly required the technical complexity for this is essentially less than in a distributed variant. The supply of supply fluid is also easier. A common fluid pump may supply all hydrostatic devices 11 belonging to the fluid sump. The non-return valves 44 are required when the fluid flowing out to the control element 31 does not flow into the sump 29 but directly into the suction channel 26a. In this case, a pressure limiting valve 47 keeps the feed pressure constant, whilst the further pressure limiting valves 57 limit the maximum pressure of the system. Depending on where the threshold points of the structure are, in this case even a system pressure of considerably above 450 bar is conceivable.

Figure 14:
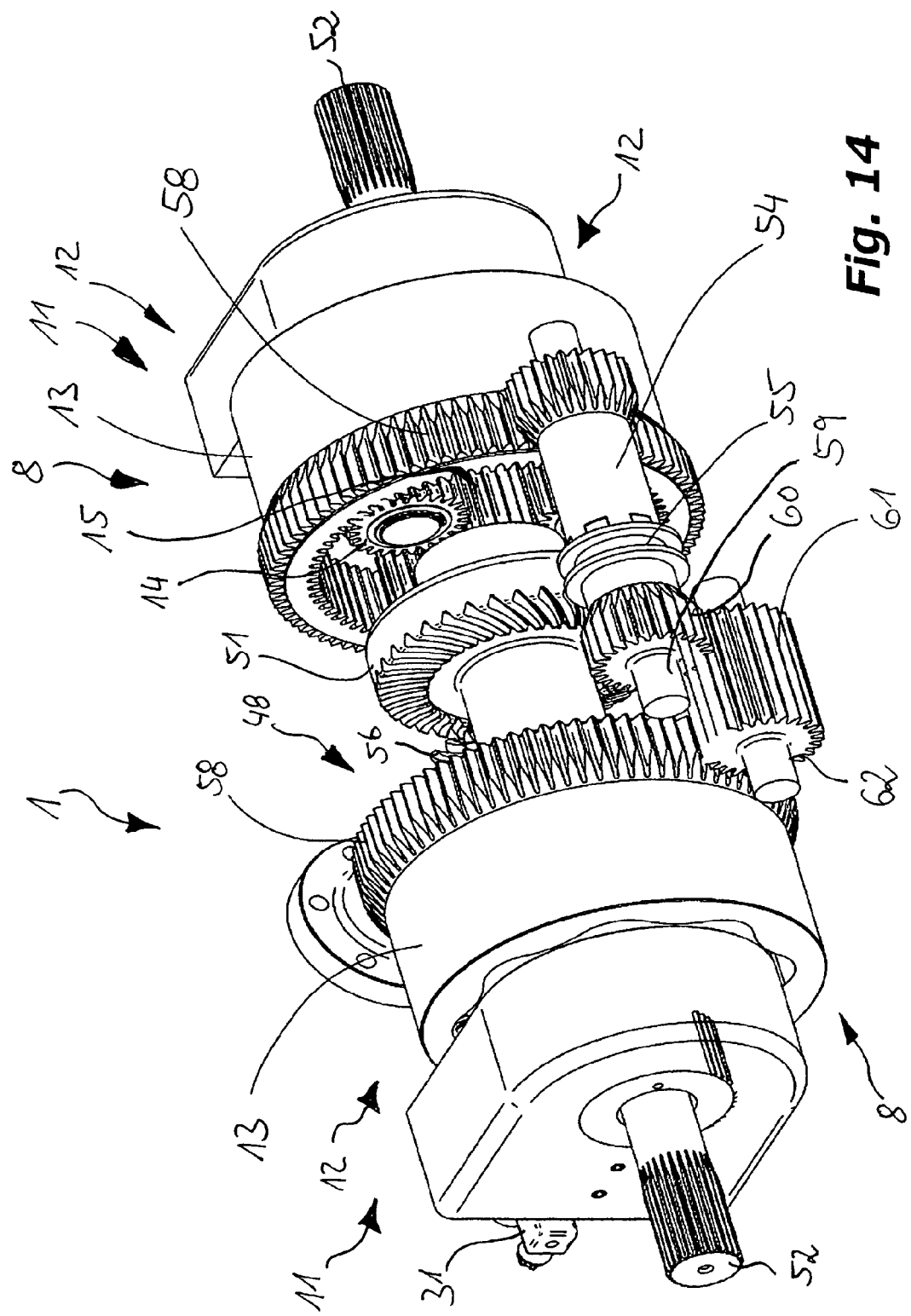
FIG. 14 shows a perspective partially sectional side view of a further exemplary embodiment of a gearbox arrangement with a compensation gear and switching means which may be connected.

It should be noted that all previously shown embodiments are not torque-controlled. The rotational speeds of the wheels are always the result of calculated values. The advantages of the distributed embodiment and also the compact embodiment of the gearbox arrangement 1 according to the invention, however, may also be compared with the drawback of power loss to be evaluated in a variable manner. During road travel or on easy terrain, the drawbacks of energy loss prevail, whilst on difficult terrain the advantages of complete (100%) traction clearly prevail. FIG. 14 shows a further embodiment compensating for said drawback, in combination with FIG. 16. Also in this case, a further description of the hydrostatic part is dispensed with.

Figure 16:
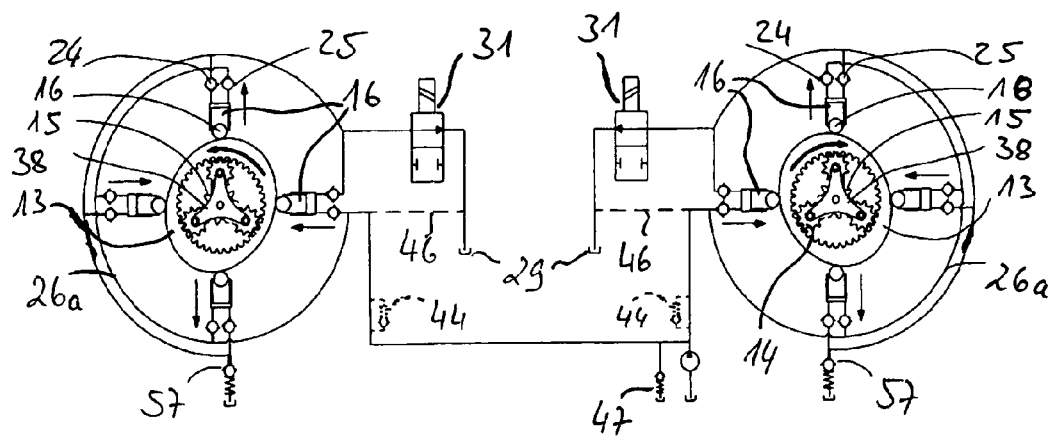
FIG. 16 shows a schematic view of the fluid circuit of the gearbox arrangement of FIG. 14.

During road travel and/or on easy terrain, as shown schematically in FIG. 16, the control element 31, formed there as a magnetic valve, is not supplied with current. This state corresponds to a fully open valve, so that fluid is able to flow unhindered in the direction of the arrow to the control element 31, whereby the hydrostatic unit does not have an active function. As with a forward movement of the vehicle a torque is created on both internal gear wheels 13 of FIG. 14 when a hydrostatic unit is deactivated said torque has to be otherwise assisted. This object is achieved mechanically in this case. The internal gear wheels 13 in FIG. 14 have in each case in their portion facing the crown wheel 51 on their outer periphery a toothing 58, which is operatively connected to the countershaft 54 arranged parallel to the output shafts 52. The countershaft 54 is in turn releasably connected fixedly in terms of rotation via the switching means 55 formed as claw clutch, with the coaxially aligned shaft 59. The claw clutch in this case serves as an example and may be replaced for a similar purpose by a friction clutch or hydrostatic device 11. The gearwheel 60 located on the coaxial shaft 59 is operatively connected to the gearwheel FIG. 61 of the shaft 62, which in turn meshes with the toothing 58 of the internal gear wheel 13 of the adjacent output shaft 52. This gearbox arrangement 1 with a countershaft 54 which may be engaged has the effect that a fixed connection of the two internal gear wheels 13 to one another is produced, but in the opposing direction. When traveling straight ahead, both internal gear wheels 13 are subjected to the same torque, whereby a relative movement of the internal gear wheels 13 to one another is not produced. With a right-hand corner, for example, the right-hand internal gear wheel 13 for the observer produces a greater torque and in this case rotates backwards. Via the shafts 54, 59 and 62, the left-hand internal gear wheel 13 for the observer is accelerated, whereby the left-hand side runs more rapidly. The mechanical compensation implemented by this arrangement being able to be cancelled again by releasing the operative connection of the shafts 54, 59 and 62, caused by actuating the switching means.

In such a combined system it is advantageous not to leave the choice of system to a driver who is otherwise generally overworked, but to the electronics system which is partially already present. The rotational speeds of the wheels of motor vehicles are generally already monitored by the wheel sensors of the ABS device, and the sensors of the sensor device 7, not shown further, may be used. If said rotational speeds of the wheels by considering a tolerance window with the already described engageable mechanical device are no longer maintained, the system may switch to the already described exclusively hydrostatic system. If a vehicle 2 with the gearbox arrangement of FIG. 14 is driven, for example, in mechanical mode, the claw clutch 55 is closed. If the electronics system indicates an incorrect rotational speed of the wheels, the claw clutch 55 is opened, and the hydrostatic device 11 is activated by regulating the two control elements 31.

As soon as the rotational speeds of the wheels operate correctly over a specific time period again, the claw clutch 55 is closed and the hydrostatic devices deactivated. This combined arrangement 1 may be operated advantageously so that a hydraulic loss of power does not occur on the road or on easy terrain, due to the mechanical connection it may be used as the transmission-parking brake and the vehicle is also ready for travel, even when not supplied with current.

Figure 11:
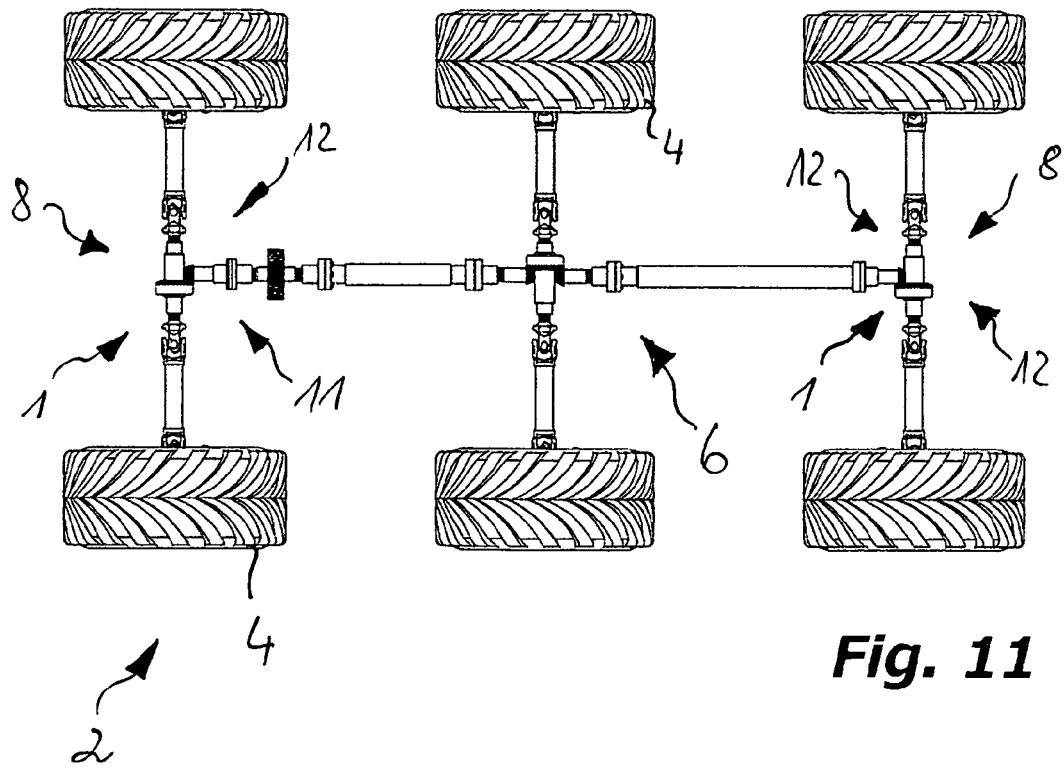
FIG. 11 shows a plan view from above of the drive train of a six-wheel, all-wheel driven vehicle with an exemplary embodiment of the gearbox arrangement according to the invention.

Finally, with reference to FIG. 11, a vehicle 2 with wheels 4 and with a plurality of gearbox arrangements 1 arranged on its drive train is shown, wherein on the vehicle all axles and thus all wheels 4 may be driven, i.e. a so-called 6×6 vehicle. The vehicle 2 is mechanically driven and only the relative movements of the drive shafts, an axle and the behavior of further axles located on the vehicle are hydrostatically adapted to the respective requirements. Depending on the device of the control device 6, and in particular the programming thereof, the axle or wheel torques may be controlled, for example in different master-slave configurations. Thus, for example, depending on requirements, in the present system all wheels are always continuously driven in the case of off-road driving. Otherwise, in the case of longer road travel the criterion of all-wheel drive is secondary and criteria such as fuel economy, tire protection and smooth running are important. By means of the control device 6, in the vehicle shown 2, and on such journeys, by default only one axle (master axle) is driven and the two other axles (slave axles) are not driven. Which axle has the master or slave function therein may also be controlled and assigned during the journey. Thus it is possible, for example, to drive the vehicle initially on the rear axle, at 30 km/h in the middle and at 50 km/h at the front, depending on which criteria are important and with which use.

FIG. 11 is intended to indicate that in the case of the vehicles and/or gearbox arrangements 1 shown a connection is produced between the mechanical drive 3, a hydrostatic device 11 and the axle compensation. Moreover, the hydrostatic device 11 also controls further axles as longitudinal compensation between axles may be dispensed with, and finally the respective vehicle 2 is mechanically driven and only the relative movements of the output shafts 52 and/or the axle-halves 5 of an axle as well as the behavior on further axles located on the vehicle are hydrostatically adapted to the respective requirements. In addition, in the proposed gearbox arrangements 1, as is visible, the internal gear wheel 13 is in close dependency with a hydrostatic device 11 which may be manipulated proportionally and which in turn only operates as a secondary device, thus mechanical energy is simply transferred into hydraulic energy.

Accordingly, therefore, the above-described invention relates to a gearbox arrangement 1 which is arranged on the drive train of a multi-axle land vehicle 2, in particular a commercial vehicle, or similar transportation means, at least one of said axles being driven, wherein at least one planetary drive 8 in each case is associated with the axle-halves 5 of a driven axle, and with at least one sensor device 7 for detecting a steering manipulation on the vehicle 2 as well as a control device 6.

In order to provide a gearbox arrangement 1, which at low cost produces both a secure, simply constructed connection between the drive motor and the driven wheels 4 and when driven and when decelerated permits a reliable control of the relevant wheels 4 with regard to rotational speed and torque, and thus a controllable rotational speed compensation during cornering is implemented and which, in particular, with vehicles 2 having a high axle torque, considerably reduces the diameter and the overall size of the power-split gearbox, it is proposed to drive the axle-halves 5 synchronously without a differential and to provide the control device 6 with a hydrostatic device 11 which may be manipulated, by means of which each of the wheels rolling without slip 4 maintains its torque.

The invention claimed is:

1. A gearbox arrangement which is arranged on a drive train of a single-axle or multi-axle land vehicle, at least one of said axles being driven, comprising at least one planetary drive associated in each case with axle halves of the driven axle, at least one sensor device for detecting a steering manipulation on the vehicle, and a control device, the planetary drives are able to be controlled by the control device using values calculated from steering manipulation data, such that each relevant wheel arranged on the respective axle half is driven at a rotational speed at which it rolls without slip, the axle halves (5) are driven synchronously without a differential, and the control device (6) has a hydrostatic device (11) which is manipulatible, by which each of the wheels (4) rolling without slip maintains its torque.

2. The gearbox arrangement as claimed in claim 1, wherein the control device (6) is provided with at least one control element (31) for controlling a circuit of a hydraulic control medium.

3. The gearbox arrangement as claimed in claim 1, wherein the at least one control element (31) is arranged spaced apart from the controlled planetary drive (8).

4. The gearbox arrangement as claimed in claim 3, wherein a rotating control member (20) with a closed contour is arranged on a planetary drive (8), said control member being provided with alternately convex and concave curved member portions, which form cams (21) and valleys (22).

5. The gearbox arrangement as claimed in claim 4, wherein the control member (20) of the planetary drive (8) is provided fixedly in terms of rotation as an annular axial portion (33) of a rotating carrier (34), rotation thereof driving a plurality of piston-cylinder arrangements (12) of the hydrostatic device (11) spaced apart by the same angle.

6. The gearbox arrangement as claimed in claim 5 wherein, the axial portion (33) on the carrier (34) is arranged in a coplanar manner or is axially offset to an internal gear wheel (13) of the planetary drive (8).

7. The gearbox arrangement as claimed in claim 6, wherein the carrier (34) is formed by the internal gear wheel (13) or a planet carrier (38).

8. The gearbox arrangement as claimed in claim 7, wherein cylinder bases (23) of the piston-cylinder arrangements (12) remote from the carrier (34), are able to be connected via at least one of a respective suction or pressure valve (24, 25) to one respective suction or pressure side of a transport device (30) of the hydraulic fluid surrounding a housing (19).

9. The gearbox arrangement as claimed in claim 8, wherein the transport device (30) is formed by at least one annular channel (26a, 26b) on the housing (19) associated with each of the suction valves (24) and each of the pressure valves (25) or by hydraulic lines.

10. The gearbox arrangement as claimed in claim 9, wherein the suction channel (26a) is connected to a low pressure supply of the hydraulic fluid.

11. The gearbox arrangement as claimed in claim 5, wherein the piston-cylinder arrangements (12) are provided with a housing (19) which is connected in a region of a periphery thereof on a pressure side to the control element (31).

12. The gearbox arrangement as claimed in claim 11, wherein the piston-cylinder arrangements (12) in each case are provided with at least one mechanical actuating (39) for assisting the movement of the pistons (16) in a direction of the internal gear wheel (13).

13. The gearbox arrangement as claimed in claim 1, wherein the planetary drives (8) of the two axle halves (5) of a driven axle with the associated hydrostatic device (11) comprising the control element (31) are arranged in an immediate vicinity of an axle power-split gearbox (50) which may be associated with the axle halves (5).

14. The gearbox arrangement as claimed in claim 1, further comprising a differential gear (53) which may be connected via a switching means (55) is arranged thereon.

15. The gearbox arrangement as claimed in claim 14, wherein the switching means (55) is provided as a clutch.

16. The gearbox arrangement as claimed in claim 15, wherein the clutch is a claw clutch, a friction clutch, or a hydrostatic device.

* * * * *